United States Patent Office 2,830,057
Patented Apr. 8, 1958

2,830,057

2(1'-PHENYL-LOWER ALKYL) PIPERIDINES AND THEIR INTERMEDIATES

Karl Hoffmann, Binningen, and Ernst Sury, Basel, Switzerland, assignors to Ciba Pharmaceutical Products, Inc., Summit, N. J.

No Drawing. Application September 19, 1955
Serial No. 535,253

Claims priority, application Switzerland
September 22, 1954

12 Claims. (Cl. 260—290)

This invention relates to piperidine compounds of the formula

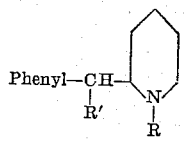

in which R represents hydrogen or a lower alkyl radical, and R' represents a lower alkyl radical, and salts of these compounds. The phenyl radical is unsubstituted or substituted by a lower alkyl, lower alkoxy group or halogen atom. The invention provides, more especially, piperidines of the above formula, in which R represents hydrogen, and salts thereof, and particularly 2-(1'-phenyl-propyl)-piperidine of the formula

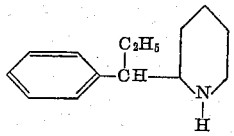

and salts thereof.

The new piperidines are made in accordance with this invention by treating with a hydrogenating agent a pyridine of the formula

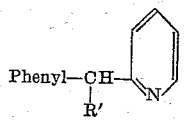

in which R' has the meaning given above, or a pyridinium compound thereof substituted at the nitrogen by a lower alkyl radical, and, if desired, introducing into the secondary piperidine so obtained a lower alkyl radical as a substituent at the ring nitrogen atom.

Those starting materials which are not known can be made, for example, by reacting an appropriate pyridyl-(2)-phenyl-acetic acid derivative, such as its nitrile, with a reactive ester of an alkanol, then splitting off the functionally converted carboxyl group, and if required, quaternating the pyridine compound so obtained. Details of this method are illustrated in the working examples below.

The hydrogenation may be carried out with agents which are known to be suitable for hydrogenating a pyridine ring. Thus, for example, the hydrogenation may be carried out with hydrogen in the presence of a catalyst, advantageously a noble metal catalyst, such as platinum, and also in the presence of nickel or copper chromite. The usual agents may be used for the N-substitution of the secondary piperidines, for example formaldehyde in the presence of formic acid or an alkyl halide in the presence of an acid binding agent.

Depending on the procedure used, the new compounds are obtained in the form of the free bases or salts thereof. From the salts the free piperidines may be obtained in a known manner, i. e. by treatment with an acid binding agent. From the free piperidines salts can be made by reaction with acids which are suitable for making therapeutically useful salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene sulfonic acid or toluene sulfonic acid or therapeutically active acids.

When a further asymmetrical carbon atom is formed by the foregoing reactions, the products are obtained in the form of mixtures of racemates. They can be separated by the usual methods, such as crystallization.

The new piperidines are central nervous system stimulants. In actual use as therapeutics they may be employed in the form of pharmaceutical preparations which contain them in admixture with a suitable pharmaceutical carrier for enteral, parenteral or oral application. As ingredients of the carrier there come into consideration for example, gelatine, lactose, starch, magnesium, stearate, talc, vegetable oils, benzyl alcohols, gums, polyalkylene glycols, petroleum jelly or cholesterol. The pharmaceutical preparations can take the form of, for example, tablets, dragees or solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are formulated by the usual methods.

For example the following preparations can be made:

| Tablets, mg | 1.0 | 5.0 |
|---|---|---|
| 2-(1'-Phenyl-propyl)-piperidine hydrochloride of Form No. 2 (Example 4) | Mg.<br>1.0 | Mg.<br>5.0 |
| Talcum | 5.7 | 3.7 |
| Lactose | 52.0 | 50.0 |
| Gelatine | 1.0 | 1.0 |
| Wheat Starch | 30.0 | 30.0 |
| Arrowroot | 10.0 | 10.0 |
| Magnesium Stearate | 0.3 | 0.3 |
| | 100.0 | 100.0 |

Ampoules: Mg.
2-(1'-phenyl-butyl)-piperidine hydrochloride of
   M. P. 183° (Example 5) _____ 2.0
Sodium chloride _____ 15.0
Secondary sodium phosphate _____ 2.0
Primary sodium phosphate _____ 4.0
Distilled water to make up, 2.0 cc.

The following examples illustrate the invention, the parts being by weight unless otherwise stated, and the relationship of parts by weight to parts by volume being the same as that of the gram to the cubic centimeter:

Example 1

15 parts of 2-(1'-phenyl-ethyl)-pyridine dissolved in 100 parts by volume of glacial acetic acid are agitated with 0.5 part of platinum oxide as catalyst at 40° C. in an atmosphere of nitrogen until the theoretical quanity of hydrogen has been absorbed. After removing the catalyst by filtration, the glacial acetic acid is distilled off in vacuo, the residue is rendered alkaline with a concentrated solution of caustic soda, and the precipitated oil is taken up in ether. After washing and drying the ethereal extract, the solvent is evaporated and the residue is distilled under reduced pressure. 2-(1'-phenyl-ethyl)-piperidine of the formula

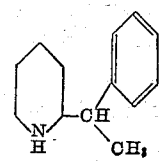

passes over at 135–136° C. under 12 mm. pressure in the form of a colorless oil.

By dissolving the base in ethyl acetate and adding a solution of hydrogen chloride in ethyl acetate its hydrochloride melting at 179–182° C. is formed.

The starting material mentioned above is obtained by condensing 97 parts of phenyl-pyridyl-(2)-acetonitrile with 78 parts of methyl iodide with the aid of 22 parts of sodamide as condensing agent. Absolute dioxane is used as solvent. By subsequent hydrolysis of the condensation product with 300 parts of sulfuric acid of 75 percent strength, there is obtained 2-(1'-phenyl-ethyl)-pyridine boiling at 142–143° C. under 12 mm. pressure.

*Example 2*

9 parts of 2-(1'phenyl-ethyl)-piperidine, 9 parts of an aqueous solution of formaldehyde of 37 percent strength (corresponding to 2.9 parts of formaldehyde) and 9 parts of formic acid are heated for 3 hours at 110–120° C. The mixture is then rendered alkaline with a concentrated solution of caustic soda, and the oil which separates out is taken up in ether. After washing and drying the ethereal extract, the solvent is evaporated and the residue is distilled in vacuo. The resulting 2-(1'phenyl-ethyl)-1-methyl-piperidine of the formula

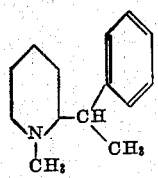

boils at 139–140° C. under mm. pressure, and forms a picrate which melts at 150–151° C.

*Example 3*

32 parts of 2-(1'-phenyl-ethyl)-1-methyl-pyridinium methosulfate dissolved in 150 parts by volume of methanol are agitated with 0.5 part of platinum oxide at room temperature in an atmosphere of hydrogen until hydrogen is no longer absorbed. After removing the methanol, the mixture is rendered alkaline with caustic soda solution, and the precipitated oil is extracted with ether. After washing and drying the ethereal extract the solvent is evaporated and the residue is distilled under reduced pressure, during which 2-(1'-phenyl-ethyl)-1-methyl-piperidine passes over at 139–140° C. under 12 mm. pressure in the form of a colorless oil. When reacted in methanolic solution with picric acid, a picrate is obtained which melts at 150–151° C. and is identical with the derivative described in Example 2.

The 2-(1'-phenyl-ethyl)-1-methyl-pyridinium methosulfate used in this example is obtained by boiling 21 parts of 2-(1'-phenyl-ethyl)-pyridine with 15 parts of dimethyl sulfate dissolved in 80 parts by volume of ethyl acetate. The hygroscopic crystals melt at 98–100° C.

*Example 4*

19.7 parts of 2-(1'-phenyl-propyl)-pyridine dissolved in 100 parts by volume of glacial acetic acid are agitated with 0.5 part of platinum oxide as catalyst in an atmosphere of nitrogen until the theoretical quantity of hydrogen has been absorbed. The product is then worked up in the manner described in Example 1. The resulting 2-(1'-phenyl-propyl)-piperidine of the formula

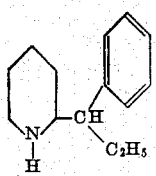

boils at 138–140° C. under 12 mm. pressure. The base exists in two diastereoisomeric forms, and they can be separated from one another by fractional crystallization of their hydrochlorides from isopropanol or of their picrates from a mixture of acetone and methanol.

In this manner there is obtained a form No. 1, whose hydrochloride melts at 180.5 to 182° C. and whose picrate melts at 177–178° C. The picrate of form No. 2 has a melting point of 167–168° C., and is more easily soluble than the picrate of form No. 1 and in contradistinction thereto is lemon yellow in color. The two picrates when mixed together melt at 153–154° C.

The starting material mentioned above can be obtained by condensing 97 parts of phenyl-pyridyl-(2)-acetonitrile with 57 parts of ethyl bromide with the aid of 22 parts of sodamide in 150 parts by volume of dioxane followed by hydrolysis of the condensation product with 300 parts of sulfuric acid of 75 percent strength. The resulting 2-(1'-phenyl-propyl)-pyridine boils at 170–173° C. under 12 mm. pressure.

*Example 5*

15 parts of 2-(1'-phenyl-butyl)-pyridine dissolved in 100 parts by volume of glacial acetic acid are agitated with 0.5 part of platinum oxide as catalyst in an atmosphere of nitrogen until the theoretical quantity of hydrogen has been absorbed. By working up the product as described in Example 1 there is obtained 2-(1'-phenyl-butyl)-piperidine of the formula

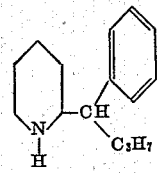

in the form of a colorless oil boiling at 153–154° C. under 12 mm. pressure. The base forms a hydrochloride which can be prepared in the usual manner, and melts at 183° C.

The starting material mentioned above is obtained by condensing 50 parts of phenyl-pyridyl-(2)-acetonitrile dissolved in 200 parts by volume of dioxane with 32 parts of n-propyl bromide with the aid of 11 parts of sodamide, and hydrolysing the condensation product with 300 parts of sulfuric acid of 75 percent strength. The resulting 2-(1'-phenyl-butyl)-pyridine boils at 158–162° C. under 12 mm. pressure.

*Example 6*

15 parts of 2-(1'-phenyl-2'-methyl-propyl)-pyridine dissolved in 100 parts by volume of glacial acetic acid are agitated with 0.5 part of platinum oxide in an atmosphere of hydrogen until the theoretical quantity of hydrogen has been absorbed. The product is then worked up as described above. The resulting 2-(1'-phenyl-2'-methyl-propyl)-piperidine of the formula

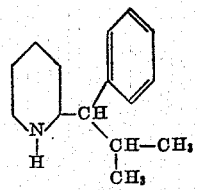

boils at 149–150° C. under 12 mm. pressure, and when recrystallized from a mixture of methanol and ether forms a hydrochloride melting at 151–152° C.

The starting material used above is prepared by condensing 60 parts of phenyl-isopropyl-acetonitrile with 60 parts of 2-bromopyridine with the aid of 16 parts of sodamide as catalyst in 250 parts by volume of dioxane as solvent. By subsequent hydrolysis of the condensation product with 300 parts of sulfuric acid of 75 percent strength, there is obtained 2-(1'-phenyl-2'-methyl-propyl)-pyridine, which melts at 138–140° C. under 0.02 mm. pressure.

Example 7

13 parts of 2-(1′-para-chlorophenyl-2′-methyl-propyl)-pyridine dissolved in 100 parts by volume of glacial acetic acid are hydrogenated with 0.3 part of platinum oxide and worked up in the manner described above. The resulting 2-(1′-para-chlorophenyl-2′-methyl-propyl)-piperidine of the formula

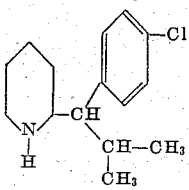

forms with hydrogen chloride in ethyl acetate a hydrochloride, which melts at 252–254° C. after recrystallization from a mixture of methanol and ether.

The starting material used above is prepared by condensing 75.4 parts of para-chlorophenyl-isopropyl-acetonitrile with 71 parts of 2-bromopyridine in 250 parts by volume of dioxane with the aid of 17.5 parts of sodamide followed by hydrolysis of the condensation product with 300 parts of sulfuric acid of 75 percent strength. The resulting 2-(1′-para-chlorophenyl-2′-methyl-propyl)-pyridine boils at 179–180° C. under 14 mm. pressure.

Example 8

15 parts of 2-(1′-phenyl-3′-methyl-butyl)-pyridine dissolved in 100 parts by volume of glacial acetic acid are hydrogenated with 0.5 part of platinum oxide and worked up in the manner described above. The resulting 2-(1′-phenyl-3′-methyl-butyl)-piperidine of the formula

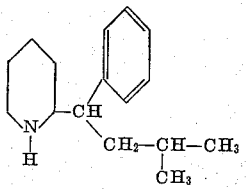

boils at 158–160° C. under 12 mm. pressure and, after fractional crystallization yields a hydrochloride melting at 238–239° C. (form No. 1).

The starting material used above is prepared by condensing 62 parts of phenyl-isobutyl-acetonitrile and 17 parts of sodamide with 70 parts of 2-bromopyridine in 300 parts by volume of dioxane followed by hydrolysis of the condensation product with 300 parts of sulfuric acid of 75 percent strength.

The resulting 2 - (1′ - phenyl - 3′ - methyl - butyl)-pyridine boils at 157–162° C. under 12 mm. pressure.

Example 9

20 parts of 2-(1′-phenyl-4′-methyl-pentyl)-pyridine dissolved in 100 parts by volume of glacial acetic acid are hydrogenated with 0.5 part of platinum oxide and worked up in the manner described above. The resulting 2-(1′-phenyl-4′-methyl-pentyl)-piperidine of the formula

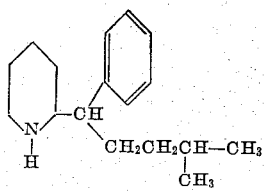

boils at 172–173° C. under 14 mm. pressure, and forms with hydrogen chloride in ethyl acetate a hydrochloride, which can be separated into the two diastereoisomeric forms by fratcional crystallization. Form No. 1 melts at 179–180° C. and form No. 2 at 204–206° C.

The starting material mentioned above is prepared by condensing 71 parts of phenyl-isoamyl-acetonitrile with 66 parts of 2-bromopyridine in 16 parts of sodamide and 250 parts by volume of dioxane followed by hydrolysis of the condensation product with 300 parts of sulfuric acid of 75 percent strength. The resulting 2-(1′-phenyl-4′-methyl-pentyl)-pyridine boils at 172–174° C.

Example 10

10 parts of 2-(1′-phenyl-ethylidene)-piperidine, dissolved in 80 parts by volume of glacial acetic acid, are hydrogenated with 0.2 part of platinum oxide and worked up in a manner described above. The resulting 2-(1′-phenyl-ethyl)-piperidine boils at 133–135° C. under 12 mm. pressure, and forms with hydrogen chloride in ethyl acetate a hydrochloride melting at 180–182° C., which is identical with the derivative described in Example 1.

The starting material mentioned above is obtained by splitting off water from 15 parts of 2-(1′-phenyl-1′-hyhydroxy-ethyl)-piperidine with 100 parts of sulfuric acid of 75 percent strength at 160° C. The base is a yellow oil boiling at 135–137° C. under 14 mm. pressure, and forms with picric acid a picrate melting at 117–119° C.

Example 11

15 parts of 2-(1′-phenyl-1′-hydroxy-ethyl)-pyridine are dissolved in 400 parts by volume of amyl alcohol and reduced at the boil by the addition of 30 parts of sodium in portions. The whole is then poured into water, washed with water, the base is extracted with dilute acid, then liberated with caustic soda solution and extracted with ether. By washing and drying the ethereal solution and evaporating the solvent there is obtained a residue which boils at 135–137° C. under 13 mm. pressure, and forms with hydrogen chloride in a mixture of ethyl acetate and ether a hydrochloride melting at 179–181° C. The product is 2 - (1′ - phenyl - ethyl) - piperidine hydrochloride which is identical with the derivative described in Examples 1 and 10.

The starting material mentioned above is obtained by adding 105 parts of acetophenone dropwise at 125–130° C. to a mixture of 14 parts of aluminium particles, 0.25 part of mercury chloride, 3 drops of mercury, 1 crystal of iodine and 180 parts of pyridine. After working up the mixture there is obtained 2-(1′-phenyl-1′-hydroxy-ethyl)-pyridine in the form of an oil boiling at 171–178° C. under 13 mm. pressure.

Example 12

19 parts of 6-phenyl-5-oxo-octanoic acid nitrile-(1) dissolved in 250 parts by volume of alcohol, are hydrogenated with 5 parts of Rupe nickel at 95–100° C. and under 100 atmospheres pressure. After 2 molecular proportions of hydrogen have been rapidly absorbed, the hydrogenation ceases for a short time. The operation is discontinued and the reaction product is filtered to remove the catalyst, then mixed with 50 parts by volume of concentrated hydrochloric acid, the solvent is evaporated, the residue is rendered alkaline with caustic soda solution, and the base is extracted with ether. After washing and drying the ethereal solution and evaporating the solvent, a residue is obtained in the form of a yellow oil boiling at 144–146° C. under 13 mm. pressure. It is 2-(1′-phenyl-propyl)-$\Delta^{1,2}$-piperidine of the formula

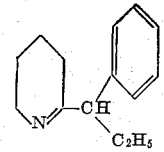

Its picrate melts at 177–178° C.

By the catalytic hydrogenation of 5 parts of 2-(1′-phenyl-propyl)-$\Delta^{1,2}$-piperidine, dissolved in 50 parts by volume of glacial acetic acid with 0.1 part of platinum oxide, there is obtained after the rapid absorption of the theoretical quantity of hydrogen 2-(1′-phenyl-propyl)-piperdine obtained as described in Example 4. Its hydrochloride melts by itself and in admixture with authentic material at 180–182° C.

The starting material mentioned above is prepared by condensing 129 parts of cyanethyl-malonic acid ditetrahydropyranyl ester with 9.6 parts of sodium hydride in 400 parts by volume of benzene with 74 parts of α-phenyl-butyric acid chloride at 30° C. The condensation product is split up by the addition of 50 parts by volume of glacial acetic acid, boiling the mixture under reflux and liberating carbon dioxide and dihydropyrane. After removing the acid constituents with alkali, 6-phenyl-5-oxo-octanoic acid nitrile-(1) remains behind as an oil boiling at 151–157° C. under 0.03 mm. pressure. It forms with 2,4-dinitro-phenyl-hydrazine in methanol an orange colored 2,4-dinitrio-phenyl-hydrazone melting at 99–100°C.

*Example 13*

42 parts of 2-(1'-phenyl-ethyl)-pyridine, dissolved in 225 parts by volume of isopropanol, are agitated with 5 parts of palladium-charcoal of 5 percent strength at 100° C. under 100 atmospheres pressure of hydrogen until hydrogen is no longer absorbed. The catalyst is then filtered off, the solvent is evaporated and the base is distilled under reduced pressure. The resulting 2-(1'-phenyl-ethyl)-piperdine boils at 132–133° C. and forms a hydrochloride melting at 180–182° C.

What is claimed is:

1. A member selected from the group consisting of a compound of the formula

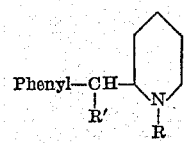

wherein R is a member selected from the group consisting of hydrogen and methyl, and R' is a lower alkyl radical, and therapeutically active acid addition salts thereof.

2. Therapeutically active acid addition salts of 2-(1'-phenyl-lower alkyl)-1-methyl-piperidine.

3. Therapeutically active acid addition salts of 2-(1'-phenyl-lower alkyl)-piperidine.

4. Therapeutically active acid addition salts of 2-(1'-halo-phenyl-lower alkyl)-piperidine.

5. The diastereoisomeric form of 2-(1'-phenyl-propyl)-piperidine, the picrate of which melts at 167–168° C.

6. Therapeutically active acid addition salts of the compound of claim 5.

7. The hydrochloride of the diastereoisomeric form of 2-(1'-phenyl-propyl)-piperidine, the picrate of which melts at 167–168° C.

8. 2-(1'-phenyl-lower alkyl)-piperdine.

9. 2-(1'-halophenyl-lower alkyl)-piperidine.

10. 2-(1'-phenyl-ethyl)-piperine.

11. 2-(1'-phenyl-butyl)-piperdine.

12. 2-(1'-phenyl-propyl)-$\Delta^{1,2}$-piperidine.

References Cited in the file of this patent

UNITED STATES PATENTS

| | | |
|---|---|---|
| 2,656,388 | Schultz | Oct. 20, 1953 |
| 2,739,968 | Sperber | Mar. 27, 1956 |

OTHER REFERENCES

Lee et al.: J. Org. Chem., vol. 9, pp. 537–46 (1944).

Bryans et al.: J. Chem. Soc. (London), for 1929, pp. 549–53 (1929).

Lukes et al.: Collection of Czechoslovak Chemical Communications, vol. 8 pp. 533–42 (1936), abstracted in Chem. Abst., vol. 31, col. 2608.

UNITED STATES PATENT OFFICE

CERTIFICATE OF CORRECTION

Patent No. 2,830,057                                    April 8, 1958

Karl Hoffmann et al.

It is hereby certified that error appears in the above numbered patent requiring correction and that the said Letters Patent should read as corrected below.

In the heading to the printed specification, line 2, in the title, for "2(1′-PHENYL-" read -- 2(1′ PHENYL- --; column 2, line 18, for "magnesium, stearate," read -- magnesium stearate, --; column 3, line 34, for "under mm." read -- under 12 mm. --; column 5, lines 19 and 20, for "conensing" read -- condensing --; column 6, line 16, for "1′-hy-" read -- 1′- --; column 8, line 19, for "piperine" read -- piperidine --; line 20, for "piperdine" read -- piperidine --.

Signed and sealed this 18th day of August 1959.

(SEAL)
Attest:

KARL H. AXLINE

Attesting Officer

ROBERT C. WATSON
                                                                  Commissioner of Patents